(12) United States Patent
McKinley

(10) Patent No.: US 12,548,560 B1
(45) Date of Patent: Feb. 10, 2026

(54) ENHANCING RECORDED CONVERSATIONS

(71) Applicant: Yac Inc., Wilmington, DE (US)

(72) Inventor: Hunter McKinley, Gainesville, FL (US)

(73) Assignee: Yac Inc., Wilmington, DE (US)

(*) Notice: Subject to any disclaimer, the term of this patent is extended or adjusted under 35 U.S.C. 154(b) by 0 days.

(21) Appl. No.: 19/089,451

(22) Filed: Mar. 25, 2025

(51) Int. Cl.
*G10L 15/26* (2006.01)
*G06V 30/19* (2022.01)
*G10L 15/183* (2013.01)
*H04N 23/63* (2023.01)

(52) U.S. Cl.
CPC ............ *G10L 15/183* (2013.01); *G06V 30/19* (2022.01); *H04N 23/631* (2023.01)

(58) Field of Classification Search
CPC ... G10L 15/26; G10L 2015/088; G10L 15/22; G10L 17/00; G10L 15/183; G06F 40/58; G06F 16/345; G06F 3/167; G06N 20/00; G06N 3/0475; G06V 30/19; H04N 23/631
See application file for complete search history.

(56) References Cited

U.S. PATENT DOCUMENTS

| | | | | |
|---|---|---|---|---|
| 8,243,902 B2* | 8/2012 | Caspi | ................... | H04M 3/568 704/235 |
| 10,248,934 B1* | 4/2019 | Shen | ................... | G06Q 10/1091 |
| 11,080,938 B1* | 8/2021 | Tzur | ...................... | G06V 20/20 |
| 11,119,985 B1* | 9/2021 | Alagianambi | .......... | G06F 9/541 |
| 11,894,941 B1* | 2/2024 | Raheja | ................. | G06V 10/764 |
| 12,184,811 B1* | 12/2024 | Byrd | ....................... | G10L 15/26 |
| 12,243,061 B1* | 3/2025 | Williamson | ......... | G06Q 30/018 |
| 2004/0121790 A1* | 6/2004 | Wolff | .................... | G06F 16/685 707/E17.103 |
| 2005/0007455 A1* | 1/2005 | Yamazaki | ............ | G06V 30/142 348/207.99 |
| 2005/0034079 A1* | 2/2005 | Gunasekar | ............ | H04M 3/567 715/756 |
| 2009/0031232 A1* | 1/2009 | Brezina | .................... | H04L 51/56 715/764 |
| 2010/0228825 A1* | 9/2010 | Hegde | ................... | G06Q 10/06 709/227 |
| 2012/0221659 A1* | 8/2012 | Brown | .................... | H04L 67/10 709/206 |
| 2014/0122270 A1* | 5/2014 | Argue | ................. | G06Q 20/047 705/21 |
| 2015/0019227 A1* | 1/2015 | Anandarajah | ........... | G10L 15/18 704/257 |
| 2015/0302098 A1* | 10/2015 | Hern | ....................... | G06F 21/41 707/708 |

(Continued)

*Primary Examiner* — Jakieda R Jackson

(57) ABSTRACT

In one embodiment, a method includes recording, by a microphone of an electronic device, audio in a vicinity of the device and capturing, by a camera of an electronic device, an image that includes information about a person in the vicinity. The method further includes extracting, based at least on the captured image, identifying information about the person; extracting a portion of the recorded audio corresponding to a conversation between a user and the person; generating a transcription of the extracted portion of the recorded audio; determining, based on the transcription and from an AI model, a summary of the conversation; and storing the summary and the extracted identifying information together in a data store for the user.

20 Claims, 2 Drawing Sheets

(56) References Cited

U.S. PATENT DOCUMENTS

| | | | |
|---|---|---|---|
| 2015/0338917 A1* | 11/2015 | Steiner | H04M 1/72412 |
| | | | 345/156 |
| 2016/0110467 A1* | 4/2016 | Hern | H04L 67/535 |
| | | | 235/375 |
| 2016/0155443 A1* | 6/2016 | Khan | G06F 3/167 |
| | | | 704/275 |
| 2016/0283465 A1* | 9/2016 | Patris | G06F 40/35 |
| 2016/0373536 A1* | 12/2016 | Boss | H04N 21/25875 |
| 2017/0053576 A1* | 2/2017 | Zhou | G06V 30/1456 |
| 2017/0324572 A1* | 11/2017 | Biggs | H04L 12/18 |
| 2017/0337722 A1* | 11/2017 | Sullivan | G06Q 20/3224 |
| 2018/0047394 A1* | 2/2018 | Tian | G10L 15/24 |
| 2018/0233139 A1* | 8/2018 | Finkelstein | A61B 5/0507 |
| 2018/0365232 A1* | 12/2018 | Lewis | G06F 40/58 |
| 2019/0258704 A1* | 8/2019 | Mertens | G10L 15/22 |
| 2019/0259377 A1* | 8/2019 | Mertens | G06F 16/638 |
| 2019/0268465 A1* | 8/2019 | Broidy | G06F 16/685 |
| 2019/0294973 A1* | 9/2019 | Kannan | G06N 3/09 |
| 2019/0327361 A1* | 10/2019 | Diriye | G06Q 10/06315 |
| 2019/0341050 A1* | 11/2019 | Diamant | G06V 40/172 |
| 2019/0392837 A1* | 12/2019 | Jung | G10L 15/22 |
| 2020/0322917 A1* | 10/2020 | Rosenberg | H04W 64/003 |
| 2021/0151058 A1* | 5/2021 | Cheung | G10L 17/00 |
| 2021/0304881 A1* | 9/2021 | White | G06K 7/1413 |
| 2021/0383127 A1* | 12/2021 | Kikin-Gil | G06V 10/811 |
| 2021/0401142 A1* | 12/2021 | Rivera | A45C 13/02 |
| 2022/0014571 A1* | 1/2022 | Polish | H04L 65/1069 |
| 2022/0027625 A1* | 1/2022 | Brake | G10L 17/22 |
| 2022/0050498 A1* | 2/2022 | Wexler | G06V 40/172 |
| 2023/0262200 A1* | 8/2023 | Ono | G10L 15/26 |
| | | | 348/14.08 |
| 2023/0333867 A1* | 10/2023 | Agarwal | G06F 40/205 |
| 2024/0005085 A1* | 1/2024 | Kukde | G10L 25/78 |
| 2024/0005386 A1* | 1/2024 | Thurairatnam | G06Q 20/02 |
| 2024/0015371 A1* | 1/2024 | Biswas | H04N 21/8549 |
| 2024/0022618 A1* | 1/2024 | Gambhir | G06F 3/0482 |
| 2024/0179520 A1* | 5/2024 | Paul | H04W 12/63 |
| 2024/0184989 A1* | 6/2024 | Mann | G06F 40/166 |
| 2024/0235872 A1* | 7/2024 | Lal | H04L 12/1831 |
| 2024/0257816 A1* | 8/2024 | Paiuk | G10L 17/06 |
| 2024/0297863 A1* | 9/2024 | Lovitt | H04L 51/10 |
| 2024/0305462 A1* | 9/2024 | Weng | H04L 9/3213 |
| 2024/0320257 A1* | 9/2024 | Amoateng | G06F 16/9535 |
| 2024/0354493 A1* | 10/2024 | Nakajima | G10L 17/18 |
| 2024/0403540 A1* | 12/2024 | Benedetto | H04L 51/216 |
| 2024/0412720 A1* | 12/2024 | Vasylyev | G06F 16/90332 |
| 2024/0414018 A1* | 12/2024 | Phillips | H04L 12/1831 |
| 2025/0028579 A1* | 1/2025 | Mehmeri | G06N 3/006 |
| 2025/0104699 A1* | 3/2025 | Murthy | G06F 3/04817 |
| 2025/0117112 A1* | 4/2025 | Koehler | H04L 51/04 |
| 2025/0131201 A1* | 4/2025 | Ullrich | G06F 40/35 |
| 2025/0158942 A1* | 5/2025 | Rodgers | G06F 40/20 |

\* cited by examiner

ENHANCING RECORDED CONVERSATIONS

TECHNICAL FIELD

This application generally relates to enhancing recorded conversations.

BACKGROUND

Many business events are structured around having many conversations with a variety of people, many of whom are being introduced for the first time. For example, trade shows, conferences, expos, and the like often include many different entities (e.g., businesses) that can reserve dedicated space at the event (e.g., a booth), send attendees to the event, or both. Such events typically involve many free-flowing and unstructured conversations with many different attendees, and the conversations at such events are typically of uncertain relevance or value prior to the conversations occurring. For example, a business attendee looking to make client or vendor connections for their asphalt-making business at an equipment-manufacturing trade show may have many conversations with attendees that are not relevant to the asphalt-maker's purpose for attending. For instance, many other attendees may be in other lines of work that are not directly related to asphalt making, and some conversations may be personal in nature (e.g., catching up with old colleagues). While the exposure and connections offered by such events provide well-known benefits to businesses and attendees, the specific conversations that realize this value are typically very unpredictable.

DESCRIPTION OF EXAMPLE EMBODIMENTS

At an event (such as a trade show, a conference, or an expo, etc.) an attendee and one or more other persons may engage in a conversation. An attendee at a professional event may have many interactions over the course of a relatively short period of time, and an attendee does not know in advance which conversations will be meaningful to a business relationship and which will be superficial or personal. An attendee typically realizes only after the fact that their conversation with another person was significant enough to warrant follow up, and then an exchange of some personal information typically takes place. For instance, participants to a conversation may tell each other their phone numbers, email addresses, or other contact information. As another example, participants may provide some physical identifying information, such as a business card or badge with a QR code, when an interaction in a professional environment is relevant enough to warrant such exchange.

However, this type of information is not unique to the specific interaction that just occurred, nor does the information explain why the interaction was relevant. At the end of the event, participants therefore must recall the specific details about each meaningful interaction and how it relates to the information received as a result of the meaningful interaction. For example, an attorney at a conference may meet (1) a potential client who is interested in the attorney's line of work, (2) a colleague who is interested in collaborating with the attorney on an article in an industry publication and (3) a vendor who can provide marketing services for the attorney's law firm. The purpose and content of these business interactions are very different, but in each instance, the attorney's contact information or business card, etc., is the same, and the information provided does nothing to signify the unique importance of each particular interaction. This creates challenges when following-up on meaningful interactions, as the interaction details and follow-up steps are subject to the limitations of a person's memory (which is often further strained by the relatively high number of conversations that can occur during such events), reducing the efficiency and benefits of such events. Many attendees take brief notes about an interaction, such as on a business card provided by a participant, but these notes do not capture the full conversation that the participants had and require dedicated time and effort to create.

Figure 1:
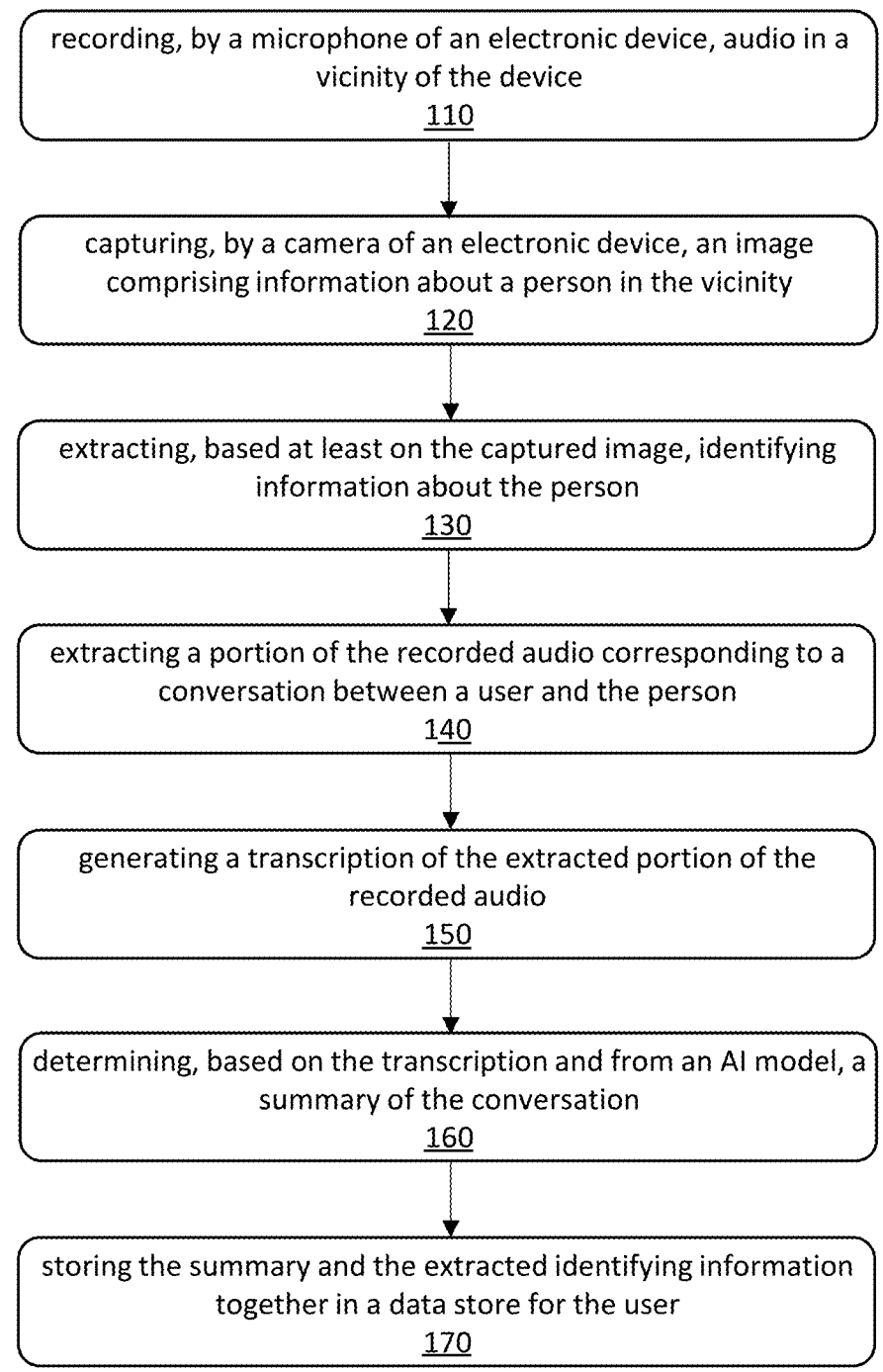
FIG. 1 illustrates an example method for recording and enhancing conversations between participants.

Automatically recording audio of conversations, whether continuously or based on predefined conditions, ensures that the audio is available after the fact for those instances in which a conversation was meaningful, which cannot be fully predicted in advance. FIG. 1 illustrates an example method for recording and enhancing conversations between participants. Step 110 of the example method of FIG. 1 includes recording, by a microphone of an electronic device, audio in the vicinity of the device. For instance, the electronic device may be a smartphone, a voice recorder, a smartwatch, etc. Any suitable transducer for capturing audio signals may be used as a microphone, which may be activated by a user and then continuously record. For example, a user may open an audio-recording application on a smartphone and then interact with (e.g., press) an element, or use voice commands, etc. that begin recording audio by the smartphone.

In particular embodiments, the audio may be recorded continuously from the time a user starts recording until the time the user ends the recording. In particular embodiments, the recording may be permanently stored, while in other embodiments the recording may overwrite portions of itself. For instance, the recording may include a sliding window (e.g., a 20-minute window, a 40-minute window, an hour window, etc.) in which the oldest portion (e.g., the oldest 1-minute portion, etc.) is overwritten as time passes, such that the recording contains the most recent block of audio of a certain length of time.

Step 120 of the example method of FIG. 1 includes capturing, by a camera of an electronic device, an image that includes information about a person in the vicinity of the recorded audio. The electronic device in step 120 may be the same electronic device in step 110; e.g., a smartphone may have both a camera and a microphone, and therefore may be used to perform steps 110 and 120. In particular embodiment, these steps may be performed by separate devices.

The image that includes information about a person may be an image of a business card, an event badge, a QR code (e.g., to a LinkedIn profile or to another social media profile), etc. For instance, a user and a person may be having a conversation at a trade show. Attendees at such events typically have a physical item with identifying information, such as a business card or badge. When the user and the person have a meaningful conversation, then the user may take a picture of the person's business card, badge, etc. in step 120.

In particular embodiments, in order to take a picture, the user may open an application (e.g., on the user's smartphone) that has a user interface with a UI element (e.g., a button) that activates the device camera to capture an image. The user interface may also include other elements, e.g., to start or stop audio recording.

In particular embodiments, capturing the image in step 120 may automatically trigger subsequent steps, such as steps 130 and 140, In other words, if a user and a person are having a conversation (which is recorded in step 110) and the user takes an image of, e.g., a business card, that one-click functionality may automatically trigger the functionality described below.

In particular embodiments the captured image is processed, for example by using optical character recognition (OCR) to identify text in the image. The processing may occur client side (e.g., may be occur on a smartphone used to capture the image) or may occur remotely, e.g., by a server device, as explained more fully below.

In particular embodiments, the image may be sent to a server device (along with a portion of the recorded audio, in particular embodiments and as described below), and a link may be created to a landing page that includes the captured image, the recorded audio, and other content described below specific to the particular image/audio combination. For instance, teams may have some members attend a trade show while other members perform follow-ups on leads generated at a trade show, and immediately creating a landing page in response to capturing the image described in step 120 may facilitate this follow-up process.

Step 130 of the example method of FIG. 1 includes extracting, based at least on the captured image, identifying information about the person. For instance, an OCR process may be used to extract text from the image, which may provide information such as the person's name, company, email address, etc. In particular embodiments, step 140 may include supplementing the information that is present in the image. For example, identifying information about the person may be extracted from the image, and this information may be used to perform internet search queries that enrich the identifying information in the image.

For instance, an image (e.g., of a business card) may be captured and then OCR'd to determine text in the business card. An AI model may then be fed the text and may identify a label for portions of the text (e.g., identifying which text corresponds to a personal name, a company name, a phone number, an email address, etc.). An internet search may then be performed using the labelled data, e.g., a search for a person whose names matches the text identified as a personal name and whose employer matches the text identified as a company name may be performed. In particular embodiments, step 140 may include identifying information corresponding to a predetermined list of information items, such as personal name, company name, email address, phone number, LinkedIn profile, etc. This set of information may correspond to information that can be uploaded to a particular CRM (customer relationship management) software. Once the information is enriched, then this additional information may be added to the landing page described above, in particular embodiments.

Step 140 of the example method of FIG. 1 includes extracting a portion of the recorded audio corresponding to a conversation between a user and the person. The portion of the recorded audio is an estimate, or determination, of the portion that is the conversation between the user and the person whose identifying information was captured in step 120 of the example method of FIG. 1. In particular embodiments, a user may perform step 130, e.g., by identifying the beginning and end of the conversation, which is used to extract that portion of the audio. In other embodiments, the portion may be automatically identified. For instance, a machine-learning model may be trained to identify the beginning and end of a conversation based on, for example, speaker IDs, semantic meaning, and other features such as the presence of common greeting phrases or farewell phrases. The conversation may initially be identified as the one that is occurring when the image is captured in step 120. The speakers IDs, semantic meanings, etc. may be identified using the audio immediately near this point, and the beginning and end of the conversation may be determined by working backwards and forwards in the recorded audio using these initial identifications.

Step 150 of the example method of FIG. 1 includes generating a transcription of the extracted portion of the recorded audio. For instance, a trained AI model may be used to perform natural-language transcription from a portion of audio. In particular embodiments, step 150 may be performed client side (e.g., by a smartphone that captured the audio) or may be performed server side (e.g., after uploading to the cloud). In particular embodiments, the transcription may be uploaded to the landing page described above, along with (in particular embodiments) the audio data itself.

Step 160 of the example method of FIG. 1 includes determining, based on the transcription and from an AI model, a summary of the conversation. The summary may include a description of the conversation, next steps following the conversation, and/or a summary of personal details discussed during the conversation.

For instance, the transcription and a prompt may be provided to an LLM instructing the LLM to output a summary of the transcription. In particular embodiments, token (or context) length limitations require dividing the transcription into multiple parts, and a summary may be generated for each part. For example, if a transcription is divided into four parts, then an LLM may be prompted to generate a summary of the conversation in each transcription part, and then the LLM may be prompted to generate an overall summary of the conversation from the four generated summaries. The same process may be used to generate a summary of next steps and personal details (e.g., an anecdote about a vacation or about a person's family or hobbies) discussed during the conversation.

In particular embodiments, the transcription may not perfectly capture the natural language in an audio portion. Moreover, the audio may be captured in a noisy environment with multiple speakers; e.g., a trade show may involve many booths situated in close proximity, and an audio recording may capture both a conversation between a person and a user as well as other audio. This may be exacerbated by silences in the conversation, e.g., a conversation may include a 1-2 minute demonstration, and there may be minimal or intermittent conversation during that demonstration. Thus, a prompt may instruct an LLM to account for periods of silence and for background noise when generation conversation summaries. For instance, a prompt may instruct the LLM to ignore transcribed text that is semantically unrelated to rest of the conversation (e.g., because the recording picked up a piece of a nearby conversation).

In particular embodiments, the result of step 160 may be a few bullet points for each of (1) the conversation (2) next steps (e.g., follow up discussed during the conversation) and (3) personal information discussed during the conversation.

Step 170 of the example method of FIG. 1 includes storing the summary and the extracted identifying information together in a data store for the user. In particular embodiments, step 170 may include storing such information in a landing page, and a link to this page may be provided to the user. In particular embodiments, step 170 may include automatically uploading such information to a CRM for the user. The information uploaded may be all or a subset of the information extracted from the image, the supplemental information, and the summaries generated from the transcribed audio portion. For instance, this information may be uploaded to each particular CRM to the extent that CRM has a dedicated field for such information. Additional information may be put in an overflow section (e.g., a notes section); and in particular embodiments, a link to the conversation-specific landing page may be uploaded to the CRM so that the full set of information (e.g., summaries, etc.) is available to the user from the contact information in the CRM database.

Particular embodiments may automatically prepare and send draft emails for the user and/or scheduling meetings with conversation participants. For instance, the conversation summaries may be used to draft an email from the user to the person. The user's calendar may be accessed, and then meeting invitations may be automatically scheduled and sent to persons along with the drafted emails. In particular embodiments, draft emails and meeting invitations may be prepared but not sent without user approval, so that a user can review the content before sending it out to actual or prospective clients.

In particular embodiments, an LLM may be asked to generate draft emails based on the various summaries generated in the example method of FIG. 1. As a result, in particular embodiments a user can go from having a conversation with a person, clicking a button to take a picture of the person's badge or business card, and then having automatically drafted, conversation-relevant emails prepared or sent on that user's behalf. The image capturing process is the trigger for the other functionality, in particular embodiments, giving the user simple but elegant control over which conversations warrant additional follow-up (e.g., CRM generate, emails, meetings, etc.), while substantially increasing the efficiency of those processes.

In particular embodiments, information from multiple users may be aggregated to provide broader conversation metrics about the conversations at an event. For example, it is impossible for organizers of a trade show to know what conversations are occurring during the trade show and what the effect of those conversations are. However, recorded conversations from multiple users (whether conversations that correspond to an image capture or all conversations recorded in the course of recording audio, e.g., in step 110 of the method of FIG. 1) may be used to generate insights about the trade show. For example, the most frequent conversation topics, keywords, and the like can be aggregated from the recorded audio. Generating these insights may involve transcribing each recording, removing personal information (e.g., personal names, brand names, etc.) and then prompting an LLM to summarize the audio.

In particular embodiments, aggregated audio from an event (e.g., a trade show) may be used to provide insights regarding conversation value. Such insights may be based on conversation data and, in particular embodiments, on subsequent activity related to or resulting from those conversations. For example, an organizer of a trade show regarding pet products may be provided with insights such as "attendees who talked about organic products at this show made 7 times more deals than those who talked about pet toys." These types of insights can be used to approach attendees with information both in real time (e.g., during or immediately after the event) or some time after the event.

For instance, an organizer may secure bookings for a subsequent event at a current event. The organizer may be able to explain to an exhibitor what the projected impact of the current event is, e.g., that an exhibitor has booked 4-5 million worth of potential contracts at the current event, based on the recorded conversations specific to that exhibitor, or that the exhibitor was in the top 10% of contracts opened for exhibitors, based on the overall conversations. Potential contracts may be valued based on average deal size over a particular period of time (e.g., lifetime), which may be provided by an entity or determined automatically based on access to that entity's CRM data. As another example, the exhibitor's CRM data entered as a result of the recorded and enhanced conversations may be accessed over time to determine what the subsequent impact of a particular event is (e.g., the value of contracts that actually ended up being entered into as a result of contacts made at the event). As a result, insights are based on real data tied to actual conversations at an event, rather than merely being based on, e.g., survey data, which is notoriously unreliable.

Figure 2:
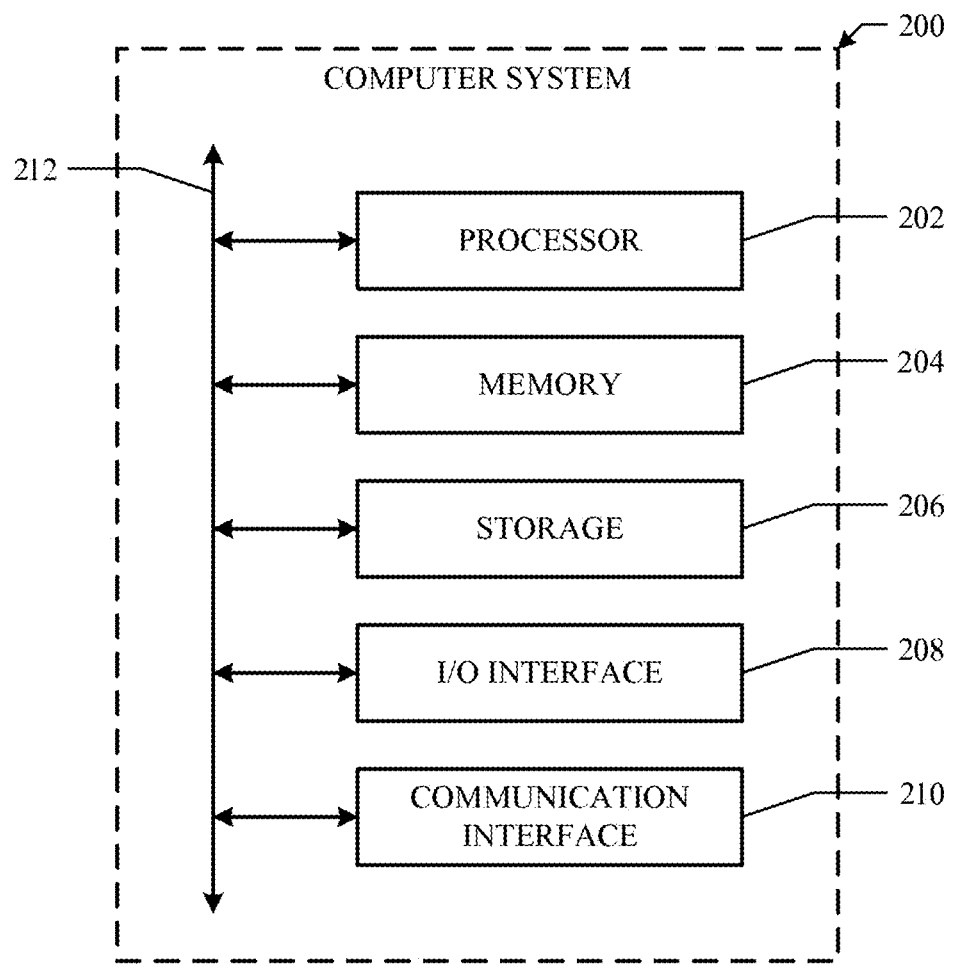
FIG. 2 illustrates an example computing system.

FIG. 2 illustrates an example computer system 200. In particular embodiments, one or more computer systems 200 perform one or more steps of one or more methods described or illustrated herein. In particular embodiments, one or more computer systems 200 provide functionality described or illustrated herein. In particular embodiments, software running on one or more computer systems 200 performs one or more steps of one or more methods described or illustrated herein or provides functionality described or illustrated herein. Particular embodiments include one or more portions of one or more computer systems 200. Herein, reference to a computer system may encompass a computing device, and vice versa, where appropriate. Moreover, reference to a computer system may encompass one or more computer systems, where appropriate.

This disclosure contemplates any suitable number of computer systems 200. This disclosure contemplates computer system 200 taking any suitable physical form. As example and not by way of limitation, computer system 200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 200 may include one or more computer systems 200; be unitary or distributed; span multiple locations; span multiple machines; span multiple data centers; or reside in a cloud, which may include one or more cloud components in one or more networks. Where appropriate, one or more computer systems 200 may perform without substantial spatial or temporal limitation one or more steps of one or more methods described or illustrated herein. As an example and not by way of limitation, one or more computer systems 200 may perform in real time or in batch mode one or more steps of one or more methods described or illustrated herein. One or more computer systems 200 may perform at different times or at different locations one or more steps of one or more methods described or illustrated herein, where appropriate.

In particular embodiments, computer system 200 includes a processor 202, memory 204, storage 206, an input/output (I/O) interface 208, a communication interface 210, and a bus 212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 202 includes hardware for executing instructions, such as those making up a computer program. As an example and not by way of limitation, to execute instructions, processor 202 may retrieve (or fetch) the instructions from an internal register, an internal cache, memory 204, or storage 206; decode and execute them; and then write one or more results to an internal register, an internal cache, memory 204, or storage 206. In particular embodiments, processor 202 may include one or more internal caches for data, instructions, or addresses. This disclosure contemplates processor 202 including any suitable number of any suitable internal caches, where appropriate. As an example and not by way of limitation, processor 202 may include one or more instruction caches, one or more data caches, and one or more translation lookaside buffers (TLBs). Instructions in the instruction caches may be copies of instructions in memory 204 or storage 206, and the instruction caches may speed up retrieval of those instructions by processor 202. Data in the data caches may be copies of data in memory 204 or storage 206 for instructions executing at processor 202 to operate on; the results of previous instructions executed at processor 202 for access by subsequent instructions executing at processor 202 or for writing to memory 204 or storage 206; or other suitable data. The data caches may speed up read or write operations by processor 202. The TLBs may speed up virtual-address translation for processor 202. In particular embodiments, processor 202 may include one or more internal registers for data, instructions, or addresses. This disclosure contemplates processor 202 including any suitable number of any suitable internal registers, where appropriate. Where appropriate, processor 202 may include one or more arithmetic logic units (ALUs); be a multi-core processor; or include one or more processors 202. Although this disclosure describes and illustrates a particular processor, this disclosure contemplates any suitable processor.

In particular embodiments, memory 204 includes main memory for storing instructions for processor 202 to execute or data for processor 202 to operate on. As an example and not by way of limitation, computer system 200 may load instructions from storage 206 or another source (such as, for example, another computer system 200) to memory 204. Processor 202 may then load the instructions from memory 204 to an internal register or internal cache. To execute the instructions, processor 202 may retrieve the instructions from the internal register or internal cache and decode them. During or after execution of the instructions, processor 202 may write one or more results (which may be intermediate or final results) to the internal register or internal cache. Processor 202 may then write one or more of those results to memory 204. In particular embodiments, processor 202 executes only instructions in one or more internal registers or internal caches or in memory 204 (as opposed to storage 206 or elsewhere) and operates only on data in one or more internal registers or internal caches or in memory 204 (as opposed to storage 206 or elsewhere). One or more memory buses (which may each include an address bus and a data bus) may couple processor 202 to memory 204. Bus 212 may include one or more memory buses, as described below. In particular embodiments, one or more memory management units (MMUs) reside between processor 202 and memory 204 and facilitate accesses to memory 204 requested by processor 202. In particular embodiments, memory 204 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 204 may include one or more memories 204, where appropriate. Although this disclosure describes and illustrates particular memory, this disclosure contemplates any suitable memory.

In particular embodiments, storage 206 includes mass storage for data or instructions. As an example and not by way of limitation, storage 206 may include a hard disk drive (HDD), a floppy disk drive, flash memory, an optical disc, a magneto-optical disc, magnetic tape, or a Universal Serial Bus (USB) drive or a combination of two or more of these. Storage 206 may include removable or non-removable (or fixed) media, where appropriate. Storage 206 may be internal or external to computer system 200, where appropriate. In particular embodiments, storage 206 is non-volatile, solid-state memory. In particular embodiments, storage 206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 206 taking any suitable physical form. Storage 206 may include one or more storage control units facilitating communication between processor 202 and storage 206, where appropriate. Where appropriate, storage 206 may include one or more storages 206. Although this disclosure describes and illustrates particular storage, this disclosure contemplates any suitable storage.

In particular embodiments, I/O interface 208 includes hardware, software, or both, providing one or more interfaces for communication between computer system 200 and one or more I/O devices. Computer system 200 may include one or more of these I/O devices, where appropriate. One or more of these I/O devices may enable communication between a person and computer system 200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 208 for them. Where appropriate, I/O interface 208 may include one or more device or software drivers enabling processor 202 to drive one or more of these I/O devices. I/O interface 208 may include one or more I/O interfaces 208, where appropriate. Although this disclosure describes and illustrates a particular I/O interface, this disclosure contemplates any suitable I/O interface.

In particular embodiments, communication interface 210 includes hardware, software, or both providing one or more interfaces for communication (such as, for example, packet-based communication) between computer system 200 and one or more other computer systems 200 or one or more networks. As an example and not by way of limitation, communication interface 210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 210 for it. As an example and not by way of limitation, computer system 200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 200 may include any suitable communication interface 210 for any of these networks, where appropriate. Communication interface 210 may include one or more communication interfaces 210, where appropriate. Although this disclosure describes and illustrates a particular communication interface, this disclosure contemplates any suitable communication interface.

In particular embodiments, bus 212 includes hardware, software, or both coupling components of computer system 200 to each other. As an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 212 may include one or more buses 212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure contemplates a system that includes one or more non-transitory computer readable storage media storing instructions; and one or more processors operable to execute the instructions to perform certain functions includes embodiments in which those functions are performed by a single processor, embodiments in which those functions are performed by multiple processors that each perform all the functions, and embodiments in which those functions are performed by multiple processors (e.g., in separate computing devices) where each processor performs at least one function but less than all recited functions.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:
    recording, by a microphone of an electronic device, audio in a vicinity of the device;
    capturing, by a camera of an electronic device and in response to an explicit image-capture command from a user of the electronic device, an image of an inanimate object comprising information about a person in the vicinity;
    extracting, based at least on the captured image, identifying information about the person;
    in response to the camera capturing the image of the inanimate object comprising information about the person, then triggering, as a result of the camera capturing the image, a conversation-extraction process from the recorded audio for a particular conversation between the user and the person, comprising:
        extracting a portion of the recorded audio corresponding to a conversation between the user and the person;
        generating a transcription of the extracted portion of the recorded audio;
        determining, based on the transcription and from an artificial intelligence (AI) model, a summary of the conversation; and
    storing the summary and the extracted identifying information together in a data store for the user.

2. The method of claim 1, wherein:
    the microphone and the camera are each part of a mobile device of the user; and
    capturing the image comprising information about the person comprises receiving a single user input on a user interface (UI) displayed on the mobile device, the UI comprising an interactive element for capturing the image.

3. The method of claim 1, further comprising enriching, based on an internet search query using the extracted identifying information about the person, the identifying information with additional identifying information about the person.

4. The method of claim 1, wherein extracting a portion of the recorded audio corresponding to a conversation between a user and the person comprises determining, by an AI model, the portion of the recorded audio corresponding to the conversation.

5. The method of claim 1, further comprising determining, based on the transcription and from the AI model, a summary of (1) one or more follow-up action items and (2) one or more personal details of the person.

6. The method of claim 1, further comprising generating a uniform resource locator (URL) to a landing page comprising the stored summary and extracted identifying information.

7. The method of claim 1, further comprising generating, by an AI model, a draft email to the person from the user based on the summary of the conversation.

8. The method of claim 1, further comprising automatically populating an entry, based on the stored summary and identifying information, for the person in a customer relationship management (CRM) of the user.

9. The method of claim 1, further comprising:
generating a transcription of each of a plurality of audio recordings from a plurality of electronic devices at a particular event;
determining, based on the generated transcriptions, one or more conversation metrics at the event.

10. A system comprising one or more non-transitory computer readable storage media storing instructions; and one or more processors operable to execute the instructions to:
record, by a microphone of an electronic device, audio in a vicinity of the device;
capture, by a camera of an electronic device and in response to an explicit image-capture command from a user of the electronic device, an image of an inanimate object;
extract, based at least on the captured image, identifying information about the person;
in response to the camera capturing the image of the inanimate object comprising information about the person, then trigger, as a result of the camera capturing the image, a conversation-extraction process from the recorded audio for a particular conversation between the user and the person, comprising:
extract a portion of the recorded audio corresponding to a conversation between the user and the person;
generate a transcription of the extracted portion of the recorded audio;
determine, based on the transcription and from an artificial intelligence (AI) model, a summary of the conversation; and
store the summary and the extracted identifying information together in a data store for the user.

11. The system of claim 10, wherein:
the microphone and the camera are each part of a mobile device of the user;
capturing the image comprising information about the person comprises receiving a single user input on a user interface (UI) displayed on the mobile device, the UI comprising an interactive element for capturing an image.

12. The system of claim 10, further comprising one or more processors that are operable to execute the instructions to enrich, based on an internet search query using the extracted identifying information about the person, the identifying information with additional identifying information about the person.

13. The system of claim 10, wherein extracting a portion of the recorded audio corresponding to a conversation between a user and the person comprises determining, by an AI model, the portion of the recorded audio corresponding to the conversation.

14. The system of claim 10, further comprising one or more processors that are operable to execute the instructions to determine, based on the transcription and from the AI model, a summary of (1) one or more follow-up action items and (2) one or more personal details of the person.

15. The system of claim 10, further comprising one or more processors that are operable to execute the instructions to generate a uniform resource locator (URL) to a landing page comprising the stored summary and extracted identifying information.

16. The system of claim 10, further comprising one or more processors that are operable to execute the instructions to generate, by an AI model, a draft email to the person from the user based on the summary of the conversation.

17. The system of claim 10, further comprising one or more processors that are operable to execute the instructions to automatically populate an entry, based on the stored summary and identifying information, for the person in a customer relationship management (CRM) of the user.

18. The system of claim 10, further comprising one or more processors that are operable to execute the instructions to:
generating a transcription of each of a plurality of audio recordings from a plurality of electronic devices at a particular event;
determining, based on the generated transcriptions, one or more conversation metrics at the event.

19. One or more non-transitory computer readable storage media storing instructions that are operable when executed to:
record, by a microphone of an electronic device, audio in a vicinity of the device;
capture, by a camera of an electronic device and in response to an explicit image-capture command from a user of the electronic device, an image of an inanimate object;
extract, based at least on the captured image, identifying information about the person;
in response to the camera capturing the image of the inanimate object comprising information about the person, then trigger, as a result of the camera capturing the image, a conversation-extraction process from the recorded audio for a particular conversation between the user and the person, comprising:
extract a portion of the recorded audio corresponding to a conversation between the user and the person;
generate a transcription of the extracted portion of the recorded audio;
determine, based on the transcription and from an artificial intelligence (AI) model, a summary of the conversation; and
store the summary and the extracted identifying information together in a data store for the user.

20. The media of claim 19, wherein:
the microphone and the camera are each part of a mobile device of the user; and
capturing the image comprising information about the person comprises receiving a single user input on a user interface (UI) displayed on the mobile device, the UI comprising an interactive element for capturing an image.

* * * * *